R. CRAIG.
RACK AND PINION DEVICE FOR SCALES.
APPLICATION FILED JUNE 18, 1920.
1,411,270.
Patented Apr. 4, 1922.
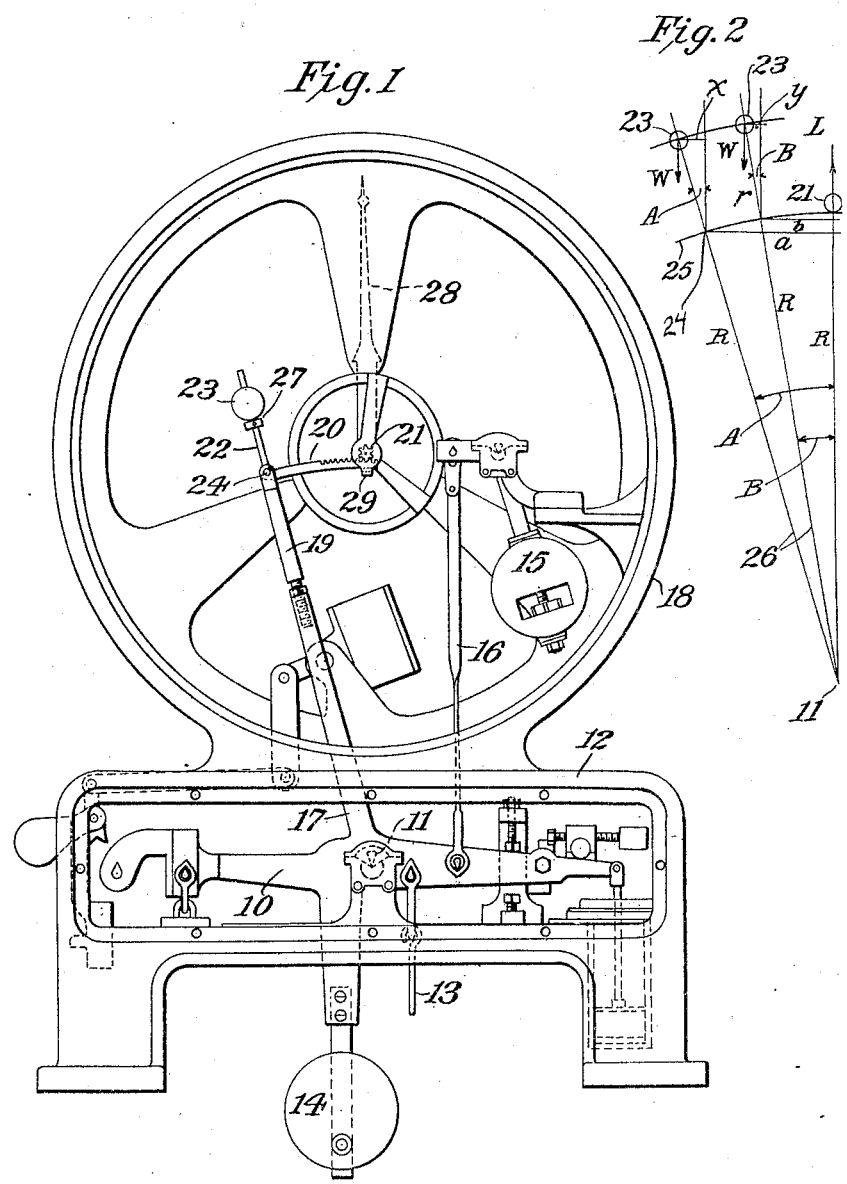
INVENTOR
Robert Craig
BY
Kerr Page Cooper + Hayward
ATTORNEYS

UNITED STATES PATENT OFFICE.

ROBERT CRAIG, OF DAYTON, OHIO, ASSIGNOR TO INTERNATIONAL SCALE COMPANY, OF DAYTON, OHIO, A CORPORATION OF ILLINOIS.

RACK-AND-PINION DEVICE FOR SCALES.

1,411,270.     Specification of Letters Patent.     Patented Apr. 4, 1922.

Application filed June 18, 1920. Serial No. 389,811.

*To all whom it may concern:*

Be it known that I, ROBERT CRAIG, a citizen of the United States of America, residing at Dayton, in the county of Montgomery and State of Ohio, have invented certain new and useful Improvements in Rack-and-Pinion Devices for Scales, of which the following is a full, clear, and exact description.

In automatic scales of the type in which the weight is indicated by a pivoted index or pointer moving over a graduated dial or chart, the index or pointer is usually actuated through the medium of a pinion which is connected to the index pointer and meshes with a rack moving in harmony with a load actuated part for example the scale beam. The elimination of backlash in the rack and pinion is important from the standpoint of accurate weighing, and hence it is necessary to keep the two in mesh with each other. On the other hand it is important to keep the amount of friction between the rack and pinion to the minimum. It is accordingly the chief object of my present invention to provide a rack and pinion system which will fulfill in a satisfactory manner the conditions outlined. To this end I avoid the use of so-called horizontal counterbalanced racks in which the force of contact between the rack and pinion constantly varies for varying positions of the rack and provide an arcuate rack which is enmeshed with the pinion with a constant pressure irrespective of the relative displacement of the rack. To attain this constant enmeshment pressure necessitates a particular location of the pivot center for the rack which is of the arcuate type, and also a particular location for the enmeshing weight.

The form briefly outlined above is illustrated in the accompanying drawing, in which—

Fig. 1 is a rear view with the rear walls of the dial housing removed.

Fig. 2 is a diagrammatic view showing the lines of action of the enmeshment forces for two positions of the arcuate rack.

Fig. 3 shows a detail view of the rack and enmeshing weight.

The scale beam 10 is fulcrumed at 11 in the housing 12, and is connected by the draft or steelyard rod 13 to the scale platform not shown. The rocking of the beam clockwise by the downward pull of the draft rod is resisted by a depending counterpoise 14 carried by the beam itself to one side of the fulcrum and also by an upper pendulum 15 connected to the beam by a link 16.

The scale beam 10 has an inflexible arm 17 extending radially to the fulcrum 11 and extending upwardly into the dial housing 18. This arm is preferably made in two parts, the upper part 19 being screwed into the lower and secured by a lock nut to afford a convenient adjustment of the length of the whole arm. Adjacent the top of the arm the part 19 is bifurcated to receive the rack and enmeshing weight devices. These devices consist of an arcuate rack 20 having teeth disposed on an arcuate pitch line, the radius of which is equal to the distance between the fulcrum point 11 and the pitch line of pinion 21, which enmeshes with the rack. The pitch line of rack 20 is also tangent to the pitch line of pinion 21. The rack is provided with a crank arm 22 carrying a weight 23, and the rack and crank arm assembly are supported in the bifurcated end of part 19 by a pintle 24. The location in the center of this pintle is important. For proper action it should preferably be located upon the arcuate pitch line 25 of the rack, and preferably at the point of intersection with the radial center line 26 of the arm 17—19. The weight 23 is prevented from sliding down the crank arm 22 by means of an abutment 27, and the amount of the weight can be adjusted by a substitution of different sized weights or in any desired manner. In practice, after the proper weight has been determined the weight 23 may be fixed to or integral with and forming part of arm 22. For proper action the center of gravity of weight 23 should be on the prolongation of center line 26 projected past the center of pintle 24.

The pinion 21 is mounted upon an arbor supported in ball bearings in the usual manner, and this arbor carries an index pointer 28. In order to prevent the actuate rack jumping out of mesh the bearing support carries an integral lip 29 which extends under the lower face of the rack a slight distance therefrom so as to prevent the accidental jumping of teeth. The extension carrying this lip also serves to prevent transverse disengagement of the rack and pinion.

Referring now to Fig. 2. If

R = radius of rack r = radius of weight path

W = weight of weight 23
L = upward pressure of rack and pinion,
Then $$\text{sine } B = \frac{y}{r} = \frac{b}{R} \text{ or } \frac{y}{b} = \frac{r}{R}$$

$$\text{sine } A = \frac{x}{r} = \frac{a}{R} \text{ or } \frac{x}{a} = \frac{r}{R}$$

From the above $$x : a = y : b$$

Also $$La = Wx$$

Or $$L = W\left(\frac{x}{a}\right) = W\frac{r}{R}$$

However $\frac{r}{R}$ is a constant, therefore the enmeshment pressure L will be constant irrespective of the rack displacement.

By a proper selection of the weight of part 23 the rack can be at all times maintained very lightly in mesh and the enmeshment will be at all times at constant pressure which will not subject the indicating devices to a varying friction at varying points of displacement of the rack.

The angle which the arms 17 and 19 make with the range line of the beam will depend upon the travel of the rack and other factors which will be apparent to those skilled in the art. The construction herein disclosed obviates the necessity of disposing of the pivot of the rack substantially above the pitch line radius of the pinion. The construction has heretofore been employed to minimize the tilting action of the rack in its movement. In the present construction theoretically there would be no tilting of the rack whatever, but if such tilting did occur through shock or vibration the rack will properly mesh with the pinion, due to the action of the enmeshing weight.

I claim:

1. In a scale in combination, a pivoted beam, an arm secured thereto, a pinion and index turned thereby, an arcuate rack pivoted upon said arm and enmeshing with said pinion, and means for enmeshing said rack and pinion to give constant enmeshment pressure between the teeth of the rack and pinion, said means comprising a weight carried by the rack.

2. In a scale, in combination, a pivoted scale beam, an arm secured to said beam, a pinion and an index turned thereby, an arcuate rack pivoted on said arm at a point upon the pitch line arc of said rack, and a weight carried by a part of said rack for enmeshing the rack with the pinion with a constant enmeshment pressure irrespective of the displacement of the rack.

3. In a rack, in combination, a pivoted beam, an arm secured thereto, a pinion and an index turned thereby, an arcuate rack pivoted upon said arm and meshing with the pinion, a crank arm extending upwardly from said rack and supporting a weight, said weight having its mass so disposed as to act upon said arm at a point in a line passing through the pivot of the rack and the fulcrum of the scale beam whereby the rack is enmeshed with a constant enmeshment pressure.

4. In a scale, in combination, a pivoted beam, an arm secured thereto, a pinion and an index turned thereby, a rack meshing with the pinion and pivoted upon a pivot disposed substantially upon a circle struck from the fulcrum of the beam and tangent to the pitch line of the pinion, and a weight secured to said pivoted rack and having its mass acting upon a pivot disposed in a line projected from the fulcrum point of the beam through the pivot of the rack.

5. The invention set forth in claim 4, in which the rack is an arcuate rack having its teeth disposed with their pitch line concentric to a circle struck from the fulcrum of the beam as a center.

6. In a scale, in combination, a pivoted beam, an arm coupled thereto for actuating a rack, a pinion and an index turned thereby, a rack pivoted on said arm and enmeshing with said pinion, and a weight carried by said rack and so disposed and of such weight as to give substantially constant enmeshment pressure between the rack and pinion.

7. In a scale, in combination, a pivoted beam, an arm coupled thereto for actuating a rack, a pinion and an index turned thereby, a rack pivoted upon said arm enmeshing with the pinion, a crank arm extending upwardly from said rack and supporting a weight, said weight having its mass so disposed as to act upon said arm at a point in a line passing through the pivot of the rack and the fulcrum of the scale beam, whereby the rack is enmeshed with a substantially constant enmeshment pressure.

8. In a weighing scale, in combination, a part adapted to be displaced about a center point in accordance with the applied load, a rack pivoted upon said part and displaced thereby, a pinion meshing with the rack, an index turned by said pinion, and a weight carried by said rack and having its mass disposed to act thereon at a point in a line passing through the aforesaid center point and the pivot of the rack, whereby the rack and pinion are enmeshed with substantially constant enmeshment pressure irrespective of the displacement of the rack by said part.

In testimony whereof I hereto affix my signature.

ROBERT CRAIG.